US006544445B1

(12) United States Patent
Graf et al.

(10) Patent No.: US 6,544,445 B1
(45) Date of Patent: Apr. 8, 2003

(54) FIRE-RESISTANT OPENING SEAL

(75) Inventors: Robert Graf, Altenstadt (DE); Maria-Elisabeth Kaiser, Ulm (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/367,092

(22) PCT Filed: Jan. 31, 1998

(86) PCT No.: PCT/EP98/00517

§ 371 (c)(1), (2), (4) Date: Aug. 6, 1999

(87) PCT Pub. No.: WO98/35122

PCT Pub. Date: Aug. 13, 1998

(30) Foreign Application Priority Data

Feb. 8, 1997 (DE) ........................................ 197 04 833

(51) Int. Cl.[7] ................................................ C09K 21/00

(52) U.S. Cl. ....................... 252/606; 427/154; 427/445; 428/703; 428/913; 428/920; 428/921; 442/414; 442/417; 523/179; 523/142; 523/217; 523/310; 524/196; 524/415; 524/416; 524/499; 524/589; 524/590

(58) Field of Search ......................... 252/606; 310/179; 523/142, 217; 524/196, 415, 416, 589, 494, 499, 590; 442/414, 417; 427/154, 445; 428/703, 913, 920, 921

(56) References Cited

U.S. PATENT DOCUMENTS

| | | | | | |
|---|---|---|---|---|---|
| 4,514,328 | A | * | 4/1985 | Staendeke et al. | 252/606 |
| 4,529,467 | A | * | 7/1985 | Ward et al. | 252/606 |
| 4,588,523 | A | * | 5/1986 | Tashlick | 252/606 |
| 4,724,250 | A | * | 2/1988 | Schulberte et al. | 524/707 |
| 5,177,118 | A | * | 1/1993 | Dueber et al. | 521/159 |
| 5,384,188 | A | * | 1/1995 | Lebold et al. | 428/283 |
| 5,451,451 | A | * | 9/1995 | Minnick | 428/286 |
| 5,482,686 | A | * | 1/1996 | Lebold et al. | 422/179 |
| 5,523,059 | A | * | 6/1996 | Langer | 422/179 |
| 5,594,046 | A | * | 1/1997 | Joachimi | 252/606 |
| 5,739,173 | A | * | 4/1998 | Lutter et al. | 521/99 |
| 5,942,561 | A | * | 8/1999 | Okasaki et al. | 252/606 |
| 6,001,285 | A | * | 12/1999 | Wunram | 252/606 |
| 6,010,763 | A | * | 1/2000 | Annemaier | 252/606 |
| 6,017,987 | A | * | 1/2000 | Okisaki et al. | 252/606 |
| 6,130,207 | A | * | 10/2000 | Dueber et al. | 252/609 |

FOREIGN PATENT DOCUMENTS

| | | | |
|---|---|---|---|
| EP | 0422797 A1 | * | 4/1991 |
| EP | 0 508 751 | | 10/1992 |
| EP | 0 706 979 | | 4/1996 |
| GB | 2254609 | * | 10/1992 |
| WO | WO91/11498 | | 8/1991 |

OTHER PUBLICATIONS

DIN 4102 Fire Behavior of Building Materials & Elements PT. 9, May 1990.

* cited by examiner

*Primary Examiner*—Margaret Medley
(74) *Attorney, Agent, or Firm*—John E. Drach; Steven J. Trzaska

(57) ABSTRACT

A fire-resistant composite substrate for use in making structural openings fire-resistant, the substrate containing: (a) elastically compressible particles; (b) at least one heat-activated expanding agent; (c) at least one heat-activated binder; and (d) a diisocyanate adhesive.

23 Claims, No Drawings

FIRE-RESISTANT OPENING SEAL

BACKGROUND OF THE INVENTION

This invention relates to a fire-resistant elastic closure for openings in the form of a preformed composite block.

In structural components (walls, ceilings) classified under fire prevention regulations, openings are not permitted because, in the event of a fire, flames and smoke can spread through the openings into the adjoining rooms. Above all in cases where lines (cables, pipes) are passed through these openings, the material which is to be used to close the rest of the opening has to satisfy particular requirements. Hitherto, the following means have been used to seal openings of the type in question:

mineral fiber boards or loose mineral fibers in combination with fireproof coatings and putties, mortar products, fireproof pads and polyurethane foam elements.

Some of these products have very good properties. However, the ideal solution lies in a combination of simple production and processing coupled with low material costs, high fire resistance and the possibility of rapid installation and removal.

A fireproof and smoke-proof closure for wall openings is known from German Utility Model G 87 16 908.6. This closure is made in the form of a conical stopper by foaming a fine-cell two-component foam in a suitable mold. In practice, it has been found that these conical stoppers are attended by handling difficulties which are aggravated by their tacky outer skin. In addition, numerous hollow molds have to be kept on hand in order to obtain stoppers differing in size.

A fire-retardant composite foam of polyurethane foam flakes is described in DE 35 42 326 C1. It is made by mixing the foam flakes with intumescent compounds which expand in the event of fire as a binder and/or additive and then press-molding the resulting mixture. Intumescent compounds in the form of expanded graphite may be used as the additive while intumescent compounds in the form of an epoxy resin with a melamine hydrohalide as binder may be used as the binder. The composite foam thus obtained is suitable as a composite foam panel which is placed over surfaces to be protected.

DETAILED DESCRIPTION OF THE INVENTION

The present invention relates to a fire-resistant elastic closure for openings in the form of a preformed composite block of a) at least one type of elastically compressible particles, b) at least one heat-activated expanding agent, c) at least one heat-activated binder and d) at least one adhesive by which the elastically compressible particles and the other constituents are joined to form the composite block.

The closure according to the invention is easy to make and may consist largely or entirely of recycled material. The closure according to the invention has excellent mechanical properties, particularly in regard to strength, abrasion resistance and elasticity. The closure according to the invention also has excellent fire-resistant properties. It may readily be formulated in such a way that it has a fire resistance of >F90 according to DIN 4102. Its fire resistance is thus of the same order as that of concrete components which is particularly advantageous.

In the event of fire, the heat-activated expanding agent leads to an increase in volume and provides for particularly tight sealing of the opening. Also, additional voids are created which increase heat insulation. The at least one heat-activated binder becomes tacky under the effect of heat and ensures that the individual constituents of the composite block hold together and do not disintegrate into crumbs in the event of fire. In one advantageous embodiment, at least two heat-activated binders kicking in at different temperatures are provided. Suitable heat-activated binders are, in particular, organic thermoplastics which melt at low temperatures, inorganic hotmelt adhesives, such as borates, ammonium polyphosphate, which softens over a broad temperature range and at the same time has flame-retardant properties, and glass which develops its adhesive properties at relatively high temperatures. The glass is preferably present in fine-particle form, more particularly in the form of fibers, hollow microbeads or glass powder, in particular to avoid separation of the raw materials.

In one preferred embodiment, at least two expanding agents expanding at different temperatures are provided as expanding agents. This also enables the expansion properties to be controlled over a broad temperature range. Particularly suitable expanding agents are expanded graphite and—where expansion is also desirable at high temperatures—unexpanded vermiculite and/or perlite.

To produce the composite block, the individual constituents may be premixed in fine-particle form and then mixed with the adhesive which is preferably sprayed onto the stirred mixture. The mixture wetted with the adhesive is then press-molded into a block, preferably under the effect of heat which may be uniformly introduced into the mixture, more particularly by a pulse of steam.

In one preferred embodiment of the invention, the at least one expanding agent and the at least one heat-activated binder are present in the form of granules containing both constituents. Highly uniform distribution of the constituents in the closure is obtained in this way, resulting in highly uniform mechanical and fire-retardant properties. Particularly suitable granules of this type are described as a swelling agent composition in DE 39 30 722 A1. Reference is expressly made here to the disclosure of that document. In general, the composite blocks are made up of 10 to 50% by weight and more particularly around 40% by weight of elastically compressible particles, 20 to 70% by weight and, more particularly, 40 to 60% by weight of the combination of heat-activated expanding agents and heat-activated binder and 0.5 to 20% by weight and more particularly around 10% by weight of adhesive. The combination of heat-activated expanding agent and heat-activated binder generally splits up into 40 to 80% by weight and more particularly 30 to 50% of expanding agent, more particularly expanding agent mixture, and 60 to 20% by weight and more particularly 70 to 50% by weight of binder, more particularly binder mixture.

In one preferred embodiment, the adhesive which holds the constituents of the composite block together is a diisocyanate, more particularly diphenyl methane diisocyanate, which is preferably set with water. The water of the steam pulse or the aqueous medium with which the adhesive is added may be used for setting. In another preferred embodiment of the invention, the adhesive which holds the constituents of the composite block together is a thermoplastic, more particularly a thermoplastic which can be applied in an aqueous medium, for example in the form of a dispersion. This thermoplastic may simultaneously act as the heat-activated binder. Examples of such thermoplastics are polyvinyl acetate/ethylene copolymers and polyvinyl acetate/ethylene/vinyl chloride terpolymers.

The closure according to the invention is preferably porous and, more particularly, has a rough surface. On the one hand, this makes it particularly compressible. On the other hand, the rough surface provides for effective adhesion in the openings to be closed.

Interestingly, it has been found that, despite its heterogeneous composition, the closure according to the invention has the properties of a homogeneous material. This is partly attributable to the fact that the particle sizes of its individual constituents, more particularly the elastically compressible particles, are different which provides for a uniform and dense packing. The elastically compressible particles may be substantially solid, such as pieces of rubber or pieces of cork. However, they are preferably porous. Thus, in one preferred embodiment, the composite block is a composite foam block while the elastically compressible particles are foam particles. Other suitable compressible particles are balls of fibers. Fibers and other compressible particles may also be present in combination with one another. In preferred embodiments, the elastically compressible particles have open pores, as is the case with fiber balls and open-cell foam particles. With open-pore particles such as these, relatively small constituents of the mixture can partly penetrate into the pores which further promotes homogeneity. The particle size of the individual constituents can vary within wide limits. In the case of the compressible particles, it is generally between 1 and 20 mm and more particularly between 1 and 5 mm. The other constituents may be present in the form of powders or particles with a particle size of 0.001 to 10 mm, preferably 0.1 to 5 mm and more preferably 0.3 to 5 mm.

As mentioned above, the closures according to the invention are preferably made from relatively large blocks. Sheets of suitable thickness can be cut from these blocks. This is easily done because the constituent material of the composite block is easy to cut, for example with knives, scissors or hot wires. The sheets can also be stamped out from the blocks. In this way, any size and shape of closure can be produced without having to keep a supply of special molds. The waste accumulating can readily be recycled by being used as elastically compressible particles in the production of new composite blocks. Since—in that case—these particles already contain the heat-activated binders and expanding agents, their quantities can be reduced accordingly. It is also possible with advantage to prepare holes and openings for the passage of lines in the closures, for example by partial stamping.

Since the density of the starting materials is generally of the order of 1, the closures correspondingly contain 800 to 400 and, more particularly, 750 to 600 l gas/$m^3$. The elasticity modulus of the closures is generally in the range from $1 \cdot 10^3$ to $1 \cdot 10^5$ N/$m^2$, preferably in the range from 4 to $10 \cdot 10^3$ N/$m^2$ and more preferably of the order of $7 \cdot 10^3$ N/$m^2$. The closures advantageously have a compression hardness (at 40% compression) of $1 \cdot 10^2$ to $7 \cdot 10^3$ N/$mm^2$, preferably 1.3 to $5 \cdot 10^2$ N/$mm^2$ and more preferably of the order of $1.7 \cdot 10^2$ N/$mm^2$. The Shore A hardness values of the closures is preferably in the range from 10 to 40, more preferably in the range from 12 to 20 and most preferably of the order of 15. These mechanical properties can be suitably varied by controlling the production conditions.

Other features and advantages of the invention will become apparent from the following description of Examples in conjunction with the subsidiary claims. In one embodiment of the invention, the individual features may be present either individually or in various combinations with one another.

EXAMPLE 1

A dry mixture is prepared from the following ingredients:

45 parts by weight of chips of flexible polyurethane foam with various particle sizes of 1 to 7 mm 10 parts by weight of zinc borate as an inorganic hotmelt adhesive 12.5 parts by weight of hollow glass microbeads 9.5 parts by weight of ammonium polyphosphate and 13 parts by weight of expanded graphite.

While mixing is continued, 10 parts by weight of diphenyl methane diisocyanate dispersed in water are sprayed onto the mixture. The mixture is then heated by several steam pulses to around 150° C. in a heated mold in which it is converted into a porous composite foam block with a density of 300 kg/$M^3$ and solidified.

The composite block obtained had a Shore A hardness of 15, an elasticity modulus of $6 \cdot 10^3$ N/$m^2$ and a compression hardness (40%) of $2 \cdot 10^2$ N/$mm^2$.

The cut surfaces were porous and non-tacky. They were uniformly blue-grey in color, individual particles of expanded graphite being discernible. Sheets were cut from the composite block from which—in turn—closures of the required shape (cylinders, squares and the like) were stamped. To enable cables to be passed through, holes of various size were prestamped in such a way that the cores could be pushed out by hand, i.e. without any tools, at the building site.

The closures can be bent and compressed without any risk of breakage. They are so strong that they can be driven into openings with a hammer and can be withdrawn again with no risk of breakage or damage.

Cylinders 6 cm in diameter can be cut from the composite blocks. These cylinders are suitable for sealing holes in structural components through which power cables are passed. If two of these cylinders are driven into a bore in a 120 mm thick concrete wall through which power cables up to 20 mm in diameter are passed, a fire resistance of more than 120 minutes according to DIN 2103, Part 9, can be achieved.

EXAMPLE 2

The procedure was as in Example 1 except that granules containing expanding agent and heat-activated binder were first produced. To this end, 25% by weight of polyvinyl acetate in the form of fine granules, 35% by weight of expanded graphite, 30% by weight of hollow glass microbeads which begin to melt at ca. 700° C.

9.5% by weight borax and 0.5% by weight hydrophobic silica were mixed together while heating, the thermoplastic polyvinyl acetate softening and binding the mixture. After cooling, the cake obtained was granulated into granules with a particle size of 1 to 3 mm. 50 parts by weight of the granules were carefully mixed with 40 parts by weight of flexible polyurethane foam chips, after which 10 parts by weight of polyvinyl acetate/ethylene copolymer powder were added. The resulting mixture was introduced into a mold, heated to 120° C., left at that temperature for 15 minutes and then cooled to room temperature. Closures were again cut out or stamped out from the composite block obtained or rather from the sheets cut therefrom. The closures had similar physical properties to Example 1. On addition of water, the closures underwent surface swelling which resulted in closure and hence sealing of the pores of the closures at their surfaces.

EXAMPLE 3

A dry mixture was prepared from 45% by weight of swelling agent granules according to DE 39 30 722 A1, which already contained heat-activated binder, and 50% by weight of a foam rubber ground to a particle size of 1 to 3 mm. The mixture was sprayed with 5% by weight of diphenyl methane diisocyanate diluted with water in a ratio of 1:1. The resulting product was heated by several steam pulses to ca. 170° C. in a heated mold in which it solidified into a composite block with a density of 380 kg/m$^3$. The block had an elasticity modulus of $2 \cdot 10^4$ N/m$^2$ and a compression hardness (40%) of $2.5 \cdot 10^2$ N/mm$^2$. Closures of trapezoidal. cross-section were cut from the block and were used to seal trapezoidal steel plate flanges above walls in buildings. In a fire test according to DIN 4102, Part 2, the 120 mm thick composite blocks had a fire resistance time of more than 2 hours.

What is claimed is:

1. A fire-resistant composite substrate comprising:

(a) elastically compressible particles;

(b) at least one heat-activated expanding agent;

(c) at least two heat-activated binder each being heat-activated at a different temperature; and (d) a diisocyanate adhesive.

2. The composite substrate of claim 1 wherein at least two heat-activated binders are employed, each being heat-activated at a different temperature.

3. The composite substrate of claim 1 wherein the heat-activated binder is selected from the group consisting of an organic thermoplastic material, an inorganic hotmelt adhesive, and mixtures thereof.

4. The composite substrate of claim 3 wherein the inorganic hotmelt adhesive is selected from the group consisting of ammonium polyphosphate, zinc borate, glass, and mixtures thereof.

5. The composite substrate of claim 1 wherein the heat-activated expanding agent is selected from the group consisting of expanded graphite, unexpanded vermiculite, unexpanded perlite and mixtures thereof.

6. The composite substrate of claim 1 wherein the heat-activated expanding agent and heat-activated binder are employed, as a mixture, in granular form.

7. The composite substrate of claim 1 wherein the diisocyanate adhesive is diphenyl methane diisocyanate.

8. The composite substrate of claim 1 having an elasticity modulus of from $1\times10^3$ to $1\times10^{5\ N/m2}$.

9. The composite substrate of claim 1 having a compression hardness of from $1\times10^2$ to $1\times10^3$ N/mm$^2$.

10. The composite substrate of claim 1 having a Shore A hardness of from 10 to 40.

11. The composite substrate of claim 1 having a density of from 200 to 600 kg/m$^3$.

12. The composite substrate of claim 1 having a fire resistance of from 30 to 120 minutes.

13. A process for making a structural opening fire-resistant comprising introducing a composite substrate into the structural opening, the composite substrate comprising:

(a) elastically compressible particles;

(b) at least one heat-activated expanding agent;

(c) at least two heat-activated binder each being heat-activated at a different temperature; and d) a diisocyanate adhesive.

14. The process of claim 13 wherein at least two heat-activated binders are employed, each being heat-activated at a different temperature.

15. The process of claim 13 wherein the heat-activated binder is selected from the group consisting of an organic thermoplastic material, an inorganic hotmelt adhesive, and mixtures thereof.

16. The process of claim 15 wherein the inorganic hotmelt adhesive is selected from the group consisting of ammonium polyphosphate, zinc borate, glass, and mixtures thereof.

17. The process of claim 13 wherein the heat-activated expanding agent is selected from the group consisting of expanded graphite, unexpanded vermiculite, unexpanded perlite and mixtures thereof.

18. The process of claim 13 wherein the heat-activated expanding agent and heat-activated binder are employed, as a mixture, in granular form.

19. The process of claim 13 wherein the diisocyanate adhesive is diphenyl methane diisocyanate.

20. The process of claim 13 wherein the composite substrate has an elasticity modulus of from $1\times10^3$ to $1'10^5$ N/m$^2$.

21. The process of claim 13 wherein the composite substrate has a compression hardness of from $1\times10^2$ to $1\times10^3$ N/mm$^2$.

22. The process of claim 13 wherein the composite substrate has a Shore A hardness of from 10 to 40.

23. The process of claim 13 wherein the composite substrate has a density of from 200 to 600 kg/m$^3$.

* * * * *